May 20, 1930.  C. K. BRYCE ET AL  1,758,918

FLASH LIGHT

Filed June 15, 1927

INVENTORS:
Chalmers K. Bryce,
Homer W. Jones,
BY
Byrne, Townsend & Brickenstein
ATTORNEYS.

Patented May 20, 1930

1,758,918

UNITED STATES PATENT OFFICE

CHALMERS K. BRYCE, OF SHORT HILLS, AND HOMER W. JONES, OF NEWARK, NEW JERSEY, ASSIGNORS TO NATIONAL CARBON COMPANY, INC., A CORPORATION OF NEW YORK

FLASH LIGHT

Application filed June 15, 1927. Serial No. 199,075.

This invention relates to battery hand lamps, flashlights and the like, and more particularly to an improved means of mounting the lamp within the casing so it will remain in place when the head, reflector, and battery are removed but may be readily detached and withdrawn when desirable to permit a swollen battery to be forced out of the casing.

Diaphragms have been used heretofore as lamp supports but they have been either permanently attached to the casing so they could not be removed, secured between the casing and the head so they were liable to be inadvertently dropped when the head was removed, or screw threaded into the casing so the electrolyte from a leaking battery could corrode the threads and make their removal difficult. This invention overcomes these difficulties by providing a novel method of mounting the diaphragm in the casing together with other objects and novel features as will be apparent from the following description, taken with the drawings, in which:

Figures 1, 2, 3:
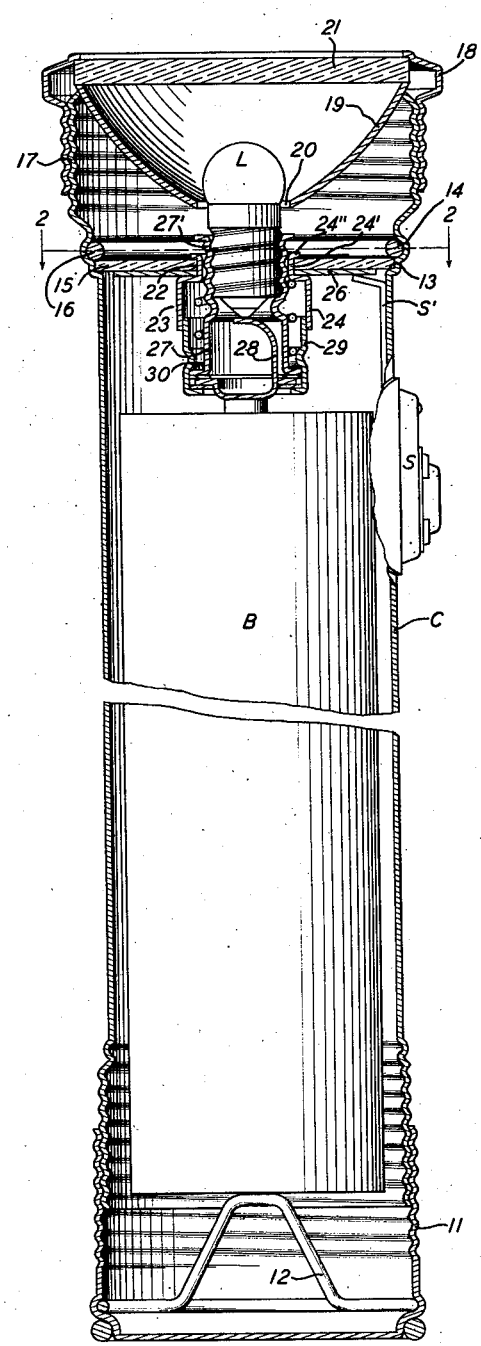
Fig. 1 is a central longitudinal sectional view of a hand lamp embodying our invention.
Fig. 2 is a detail sectional view on the line 2—2 of Fig. 1.
Fig. 3 is a central longitudinal sectional view of another form of flashlight embodying our invention.

In the drawing C designates the usual tubular casing of metal or fiber that contains the battery B of cylindrical dry cells to furnish the current to light the filament of the incandescent lamp L. The rear end of the casing is threaded to receive the threaded bottom cap 11 which carries therein a conductive wire battery support 12 arranged to engage the bottom of the battery.

Near the front end of the casing the walls are pressed outward so as to form an interior shoulder 13 and an interior groove 14. The front end of the casing is desirably expanded and threaded, as at 17, to receive the threaded bezel 18 which secures the reflector 19 and the cover glass 21 to the casing in the usual manner. A diaphragm 15 preferably of insulating material such as fiber or the like, rests upon the interior shoulder 13 and is held in place by a split circular spring ring 16 seated in the interior groove 14. The ends 16' of the spring ring 16 are turned inward so they may be gripped by a pair of pliers to contract the ring when removing it.

In the center of the diaphragm 15 is an opening 22 in which is mounted a lamp holder 23 having an outer sleeve or casing 24 with a reduced portion 24' fitting within the opening 22 and an outturned end 24" securing it in place. A contact plate 26 may be secured to the diaphragm 15 by the sleeve 24 or contact may be made directly with the sleeve 24 as will be more fully described. Within the sleeve 24 is an adjustable lamp socket 27 having a threaded front end 27' fitting within the reduced portion 24' of the sleeve 24, and an outwardly flanged rear end carrying the insulated resilient connector 28 and the guide 29 which slides within the sleeve 24 thereby supporting the rear end of the lamp socket 27. A distending spring 30 lies around the lamp socket 27 and inside the sleeve 24 and the guide 29 and serves to hold the connector 28 in contact with the central terminal of the battery B. The connector 28 also makes contact with the central terminal of the lamp L carried by the lamp socket 27 so it projects through the reflector aperture 20 in operative relation to the reflector 19.

A suitable switch S is mounted upon the outside of the casing C and is connected to the contact plate 26 by the contact strip S'. When the switch S is closed the path of the current is from the central or positive terminal of the battery to the connector 28, to the central terminal of the lamp L, through the filament to the outer terminal, to the lamp socket 27, sleeve 24, contact plate 26, contact strip S', switch S, casing C, bottom cap 11, and battery support 12 which is in contact with the outer or negative terminal of the battery. The contact plate 26 is not an essential element and may be left out when desirable and the contact made directly between the contact strip S' and the sleeve 24.

To focus the flashlight the lamp L may be moved so its filament coincides with the focal point of the reflector 19 by adjusting the bottom cap 11 on the casing C thereby moving the battery B and lamp socket 27 carrying the lamp L against the pressure of the distending spring 30 which has sufficient strength to hold the connector 28 in contact with the battery, and the battery in contact with the battery support 12 throughout the range of the focusing adjustment.

A modified form of the flashlight in which the objects of the invention are secured in a slightly different manner is shown in Fig. 3. In this drawing C designates the usual tubular casing preferably of metal which contains the battery B of cylindrical dry cells. The rear end of the casing C is threaded to receive the bottom cap 11' which carries therein the usual coiled wire battery supporting spring 12' arranged to engage the bottom of the battery.

A diaphragm 15' is carried near the front end of the casing C upon an interior shoulder 13 formed in the wall thereof and, as in the structure shown in Figs. 1 and 2, is held in place by a split circular spring ring 16 seated in an interior groove 14 formed in the wall of the casing C just above the diaphragm. The front end of the casing is slightly expanded and threaded, as at 17, to receive the threaded head fitting H. The reflector 19 and cover glass 21 are secured to the front end of the head fitting H by the bezel 18 in the usual manner. A threaded lamp socket 31 having an outturned flange 31' at its rear end is secured to the diaphragm 15' by the eyelets or rivets 32. A lamp L is carried by the lamp socket 31 so it projects through the aperture 20 of the reflector 19 in operative relation thereto. In contact with the central terminal of the lamp L is a resilient connector 33 which extends through the diaphragm 15' at 34 and is integral with a plate 35 which is secured to the diaphragm by the rivet 32 which is in contact with the central terminal of the battery B. A switch S of conventional design is mounted upon the outside of the casing C and is connected to the flange 31' of the lamp socket 31 by the contact strip S' which passes through the slot 36 in the diaphragm 15'. The focal point of the reflector 19 may be moved into coincidence with the filament of the lamp L by adjusting the head H upon the threaded end 17 of the casing C, thereby focusing the flashlight.

Various changes may be made in the details of the structure without departing from the principle of the invention. For instance the lamp socket may be differently formed and attached to the diaphragm by means well known in the art but not shown herein.

We claim:

1. In a flashlight, the combination of a casing having an interior shoulder and an interior groove; a reflector within said casing having an aperture; a diaphragm within said casing resting upon said shoulder, said diaphragm being insertable and removable through the front end of said casing; a snap ring seated in said groove and resting against said diaphragm thereby securing it in said casing; a lamp holder carried by said diaphragm and insulated from said casing and said reflector; and a lamp in said lamp holder projecting through said aperture in operative relation to said reflector.

2. In a flashlight, the combination of a casing containing a battery and having an interior shoulder and an interior groove; a reflector within said casing having an aperture; a diaphragm within said casing resting upon said shoulder, said diaphragm being insertable and removable through the front end of said casing; a snap ring seated in said groove and resting against said diaphragm; a lamp holder carried by said diaphragm and insulated from both said reflector and said casing; a lamp in said lamp holder projecting through said aperture; and a flexible connection carried by said diaphragm connecting one terminal of said lamp to one terminal of said battery.

3. In a flashlight, the combination of a casing containing a battery and having an interior shoulder and an interior groove between said shoulder and the front end of said casing; a reflector within said casing having an aperture; a diaphragm within said casing resting against said shoulder; a snap ring seated in said groove and resting against said diaphragm; a lamp holder carried by said diaphragm; a lamp in said lamp holder projecting though said aperture; and resilient means carried by said diaphragm connecting one terminal of said lamp to one terminal of said battery.

4. In a flashlight, the combination of a casing containing a battery and having an interior shoulder and an interior groove; a reflector within said casing having an aperture; a diaphragm within said casing resting against said shoulder; a snap ring seated in said groove and resting against said diaphragm; a lamp holder carried by said diaphragm; a lamp in said lamp holder projecting through said aperture; and resilient means carried by said diaphragm, insulated from said lamp holder, and connecting one terminal of said lamp to one terminal of said battery.

5. In a flashlight, the combination of a casing having an interior groove and an interior shoulder; a reflector having an aperture within said casing; a diaphragm within said casing resting upon said shoulder; a snap ring seated in said groove and resting against said diaphragm thereby holding it in said casing; said snap ring having inturned ends to facilitate its removal; a lamp holder carried by said diaphragm and insulated from said reflector; and a lamp in said lamp holder projecting through said aperture in operative relation to said reflector.

6. In a flashlight, the combination of a casing containing a battery and having an interior shoulder and an interior groove; an end cap adjustably mounted upon said casing and having an interior recess; a formed wire battery rest within said end cap having a portion seated in said recess and a portion in contact with said battery; a reflector within said casing having an aperture; a diaphragm within said casing having an opening and resting upon said shoulder; a snap ring seated in said groove and bearing against said diaphragm in a direction opposed to the pressure of said battery rest; a telescoping lamp holder comprising a guide and a sleeve secured in said opening; a lamp carried by said guide and projecting through said aperture; insulating means carried by said guide; a resilient connector carried by said insulating means and connecting one terminal of said lamp to one terminal of said battery; a distending spring within said lamp holder maintaining said connector in contact with said battery; said lamp, guide and battery being movable with relation to said reflector to focus said flashlight by adjusting said end cap on said casing.

7. In a flashlight, the combination of a casing having an interior shoulder and an interior groove; a reflector having an aperture within said casing; a diaphragm having an opening and seated upon said shoulder; a snap ring seated in said groove and bearing against said diaphragm; a telescoping lamp holder secured in said opening and having a socket; a distending spring within said lamp holder bearing against said socket; a lamp carried by said socket and projecting through said aperture; and means for moving said socket against the pressure of said distending spring to alter the focus of said flashlight.

8. A battery hand lamp comprising the combination of a casing having an interior shoulder and an interior groove; a reflector within said casing having an aperture; a diaphragm of insulating material having an opening and resting upon said shoulder; a snap ring seated in said groove and bearing against said diaphragm; a contact plate lying against said diaphragm and having an opening; a lamp holder secured in said openings thereby holding said diaphragm and said contact plate together; a lamp in said holder projecting through said aperture; and means for electrically connecting said contact plate to said casing.

9. In a flashlight, the combination of a tubular casing containing a battery and having an interior shoulder and an interior groove both near the front end of the casing, said groove being closer to such end than said shoulder; a diaphragm resting upon said shoulder; a snap ring seated in said groove and bearing against said diaphragm; a lamp holder carried by said diaphragm and in circuit with said battery; a lamp carried by said lamp holder; and a battery rest at the other end of said casing pressing said battery against said lamp holder and diaphragm, said ring resisting the tendency of said battery rest to force said diaphragm off said shoulder.

In testimony whereof, we affix our signatures.

CHALMERS K. BRYCE.
HOMER W. JONES.